United States Patent
Okada

(10) Patent No.: US 9,432,139 B2
(45) Date of Patent: Aug. 30, 2016

(54) OPTICAL MODULE HAVING COMPOSITE PRISM TO MULTIPLEX OPTICAL BEAMS

(71) Applicant: Sumitomo Electric Device Innovations, Inc., Yokohama-shi (JP)

(72) Inventor: Takeshi Okada, Yokohama (JP)

(73) Assignee: Sumitomo Electric Device Innovations, Inc., Yokohama-shi (JP)

( * ) Notice: Subject to any disclaimer, the term of this patent is extended or adjusted under 35 U.S.C. 154(b) by 172 days.

(21) Appl. No.: 14/244,705

(22) Filed: Apr. 3, 2014

(65) Prior Publication Data

US 2014/0301735 A1    Oct. 9, 2014

(30) Foreign Application Priority Data

Apr. 5, 2013  (JP) ................................. 2013-079671
Sep. 17, 2013 (JP) ................................. 2013-191901

(51) Int. Cl.
| | |
|---|---|
| G02B 6/34 | (2006.01) |
| H04J 14/02 | (2006.01) |
| G02B 27/10 | (2006.01) |
| G02B 27/09 | (2006.01) |
| G02B 6/42 | (2006.01) |

(52) U.S. Cl.
CPC ............ *H04J 14/02* (2013.01); *G02B 6/425* (2013.01); *G02B 6/4206* (2013.01); *G02B 27/0922* (2013.01); *G02B 27/1006* (2013.01)

(58) Field of Classification Search
CPC .......................... H04J 14/12; G02B 27/0922
USPC .................................................... 385/36, 47
See application file for complete search history.

(56) References Cited

U.S. PATENT DOCUMENTS

| | | | |
|---|---|---|---|
| 6,377,410 B1 | 4/2002 | Wang et al. | |
| 6,661,577 B1 | 12/2003 | Wu et al. | |
| 7,010,194 B2 * | 3/2006 | Anikitchev | G02B 6/4206 385/33 |
| 2002/0105984 A1 | 8/2002 | Yamamoto et al. | |
| 2004/0091013 A1 * | 5/2004 | Yamaguchi | G02B 27/09 372/108 |
| 2004/0101247 A1 * | 5/2004 | Chen | G02B 6/29367 385/47 |
| 2013/0322478 A1 * | 12/2013 | Adachi | H01S 5/34 372/45.01 |

FOREIGN PATENT DOCUMENTS

| | | |
|---|---|---|
| CN | 101442180 A | 5/2009 |
| CN | 102004320 A | 4/2011 |
| JP | 2001-350062 A | 12/2001 |
| JP | 2002-252420 A | 9/2002 |
| JP | 2005-181452 A | 7/2005 |

OTHER PUBLICATIONS

Notification of the First Office Action in Chinese Patent Application No. 2014101367662, dated Feb. 2, 2016.

* cited by examiner

*Primary Examiner* — Mark Hellner
(74) *Attorney, Agent, or Firm* — Venable LLP; Michael A. Sartori; F. Brock Riggs

(57) ABSTRACT

An optical module that installs a plurality of laser diodes (LDs) and a composite prism to condense optical beams emitted from the LDs is disclosed. The LDs are arranged on a line so as to level the optical beams within a plane. The composite prism includes input surfaces and output surfaces each corresponding to respective one of the input surfaces. The composite prism outputs optical beams whose intervals are narrowed compared with intervals of the optical beams entering therein.

21 Claims, 13 Drawing Sheets

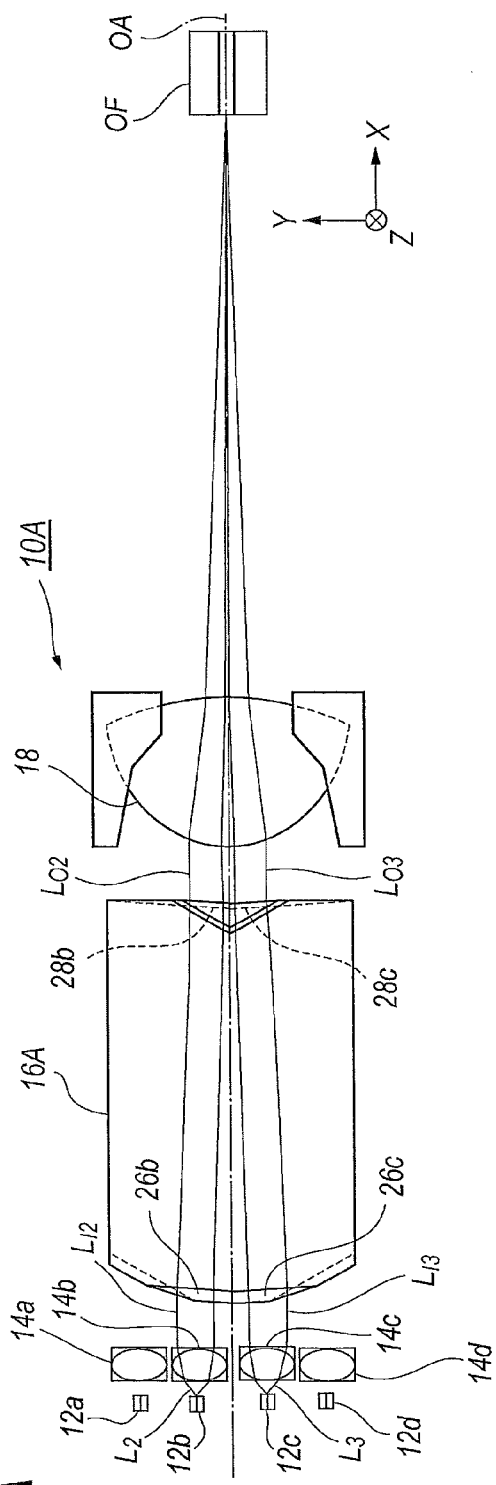
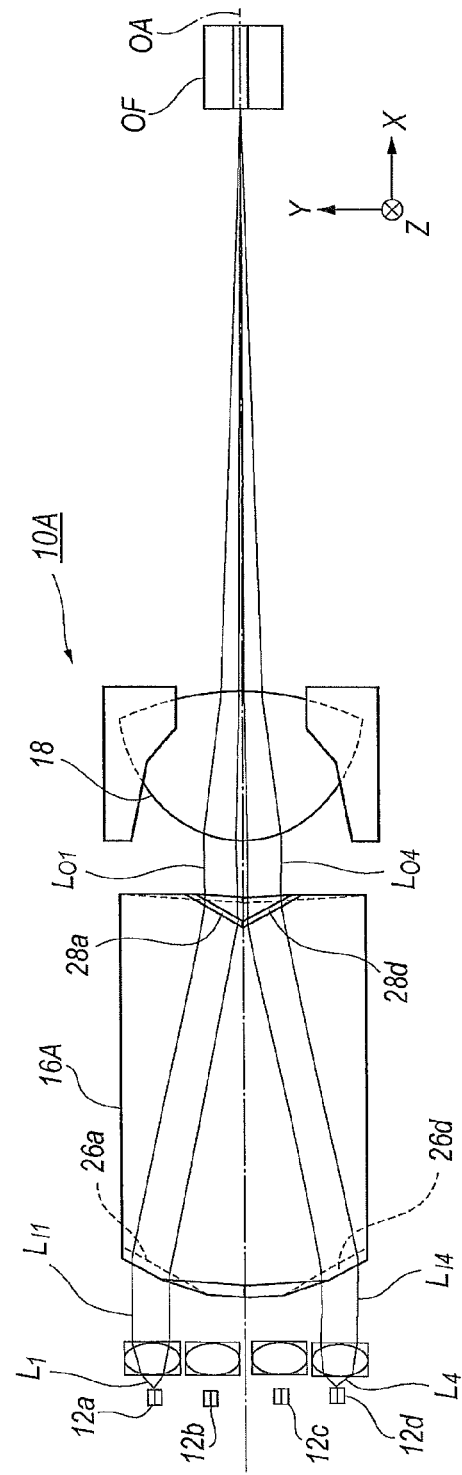
Fig. 3A
Fig. 3B

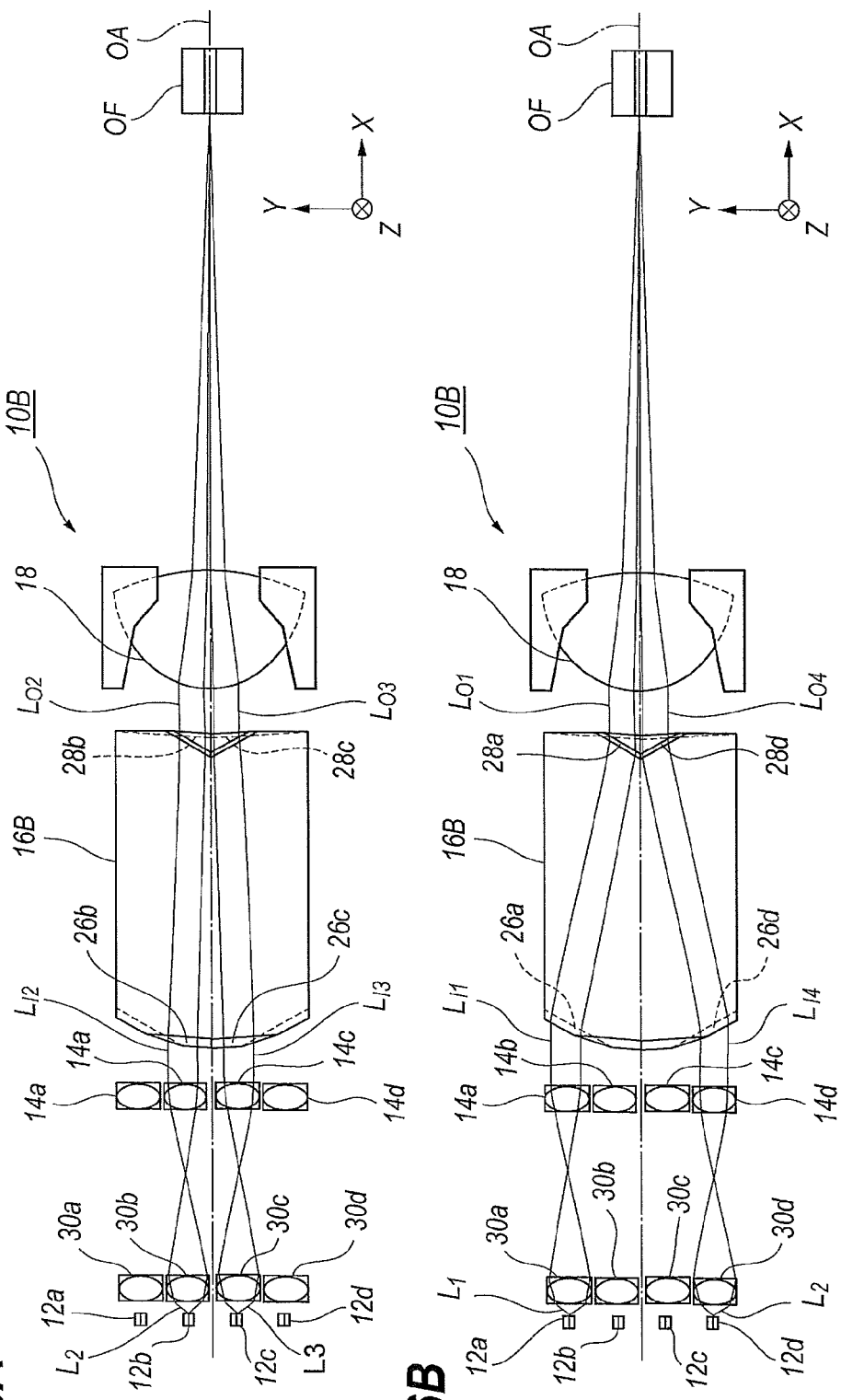

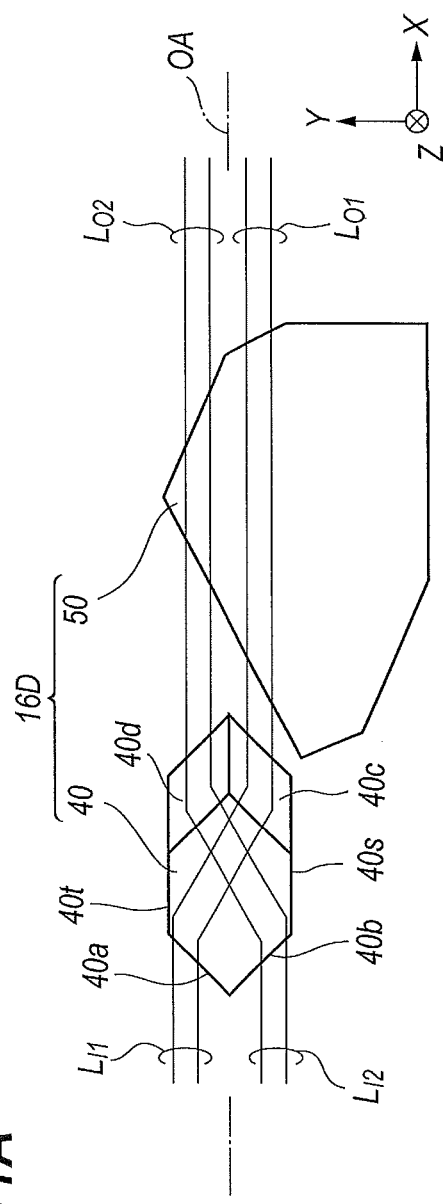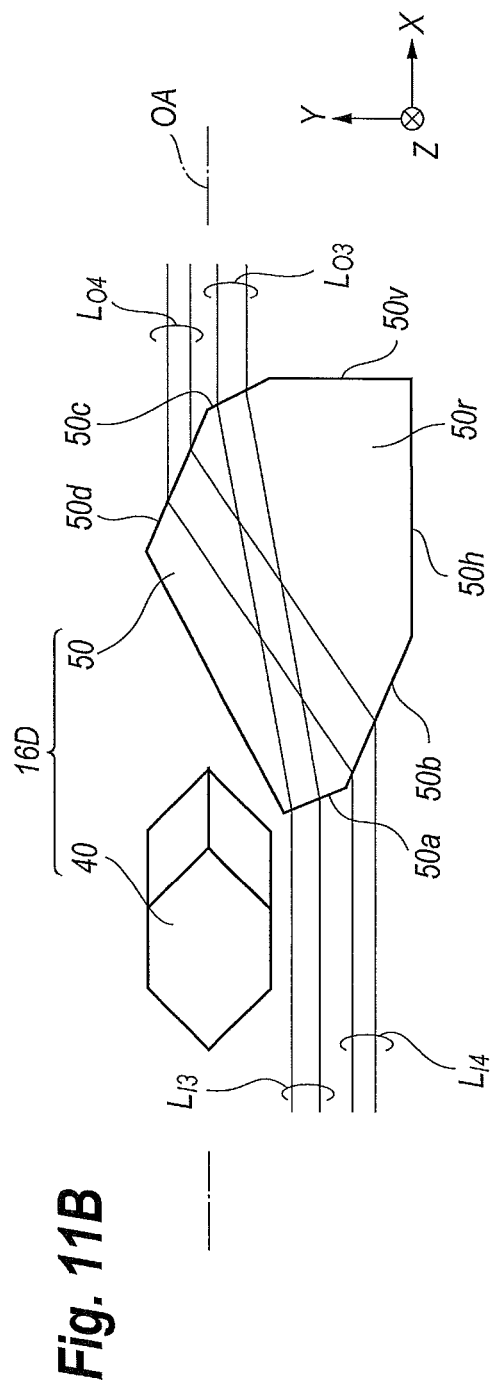

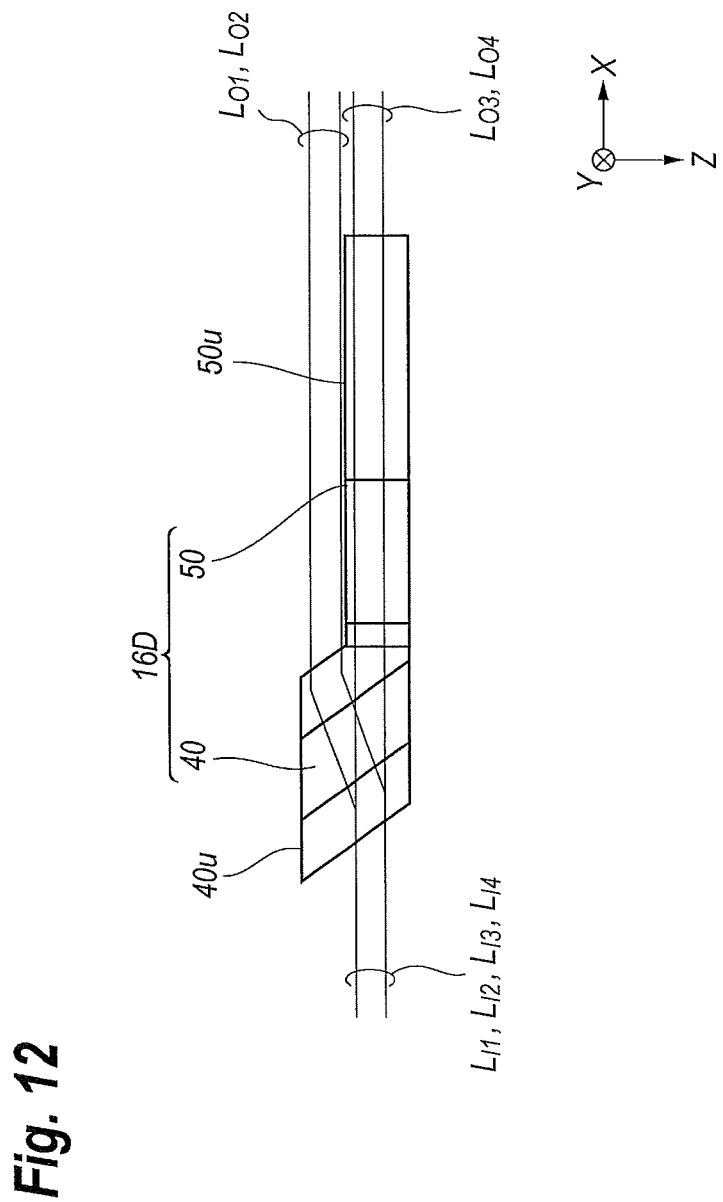

OPTICAL MODULE HAVING COMPOSITE PRISM TO MULTIPLEX OPTICAL BEAMS

BACKGROUND

1. Field

The present application relates to an optical module that multiplexes a plurality of optical beams.

2. Related Background Art

The wavelength division multiplexing (WDM) communication has become popular, where the WDM system multiplexes a plurality of optical beams each attributed to a wavelength specific thereto and different from others. An optical module applicable to the WDM system installs a plurality of semiconductor laser diodes (LDs) that emit optical beams each having a specific wavelength different from others. Such an optical module generally installs, in order to multiplex the plural optical beams into an optical fiber, for instance, an arrayed waveguide grating (AWG), a wavelength selective filter (WSF), and so on, therein. A prior document has disclosed techniques to multiplex several optical beams emitted from LDs. A polarization beam combiner (PBC) may combine two optical beams with wavelengths same to each other but the polarizations are different by 90°.

In the WDM communication system, two or more optical beams have wavelengths specific to respective optical beams but different from others. Accordingly, a PBC to multiplex two optical beams having wavelengths same to each other is unnecessary or inadequate to install within the WDM system. A WSF and/or an AWG are generally implemented within the WDM system. However, these optical components are inherently expensive. Moreover, a WSF has a limitation in intervals between wavelengths and a wavelength range.

SUMMARY

An aspect of the present application relates to an optical module that provides LDs, collimator lenses, a composite prism, and a condenser lens. The LDs emit optical beams each having a wavelength specific to each of the optical beams but different from others. The collimator lenses each correspond to the respective LDs to collimate the optical beams. The composite prism has input surfaces that receive optical beams output from respective collimator lenses and output surfaces. The condenser lens, which has an optical axis, condenses optical beams output from the respective output surfaces of the composite prism on an end of an optical fiber. A feature of the present application is that the composite prism reduces intervals between optical beams entering therein to output the optical beams with reduced intervals.

Each of the input surfaces of the composite prism is optically coupled with one of output surfaces specific to each of the input surfaces such that each of the input surfaces and one of the output surfaces specific to each of the input surfaces constitute two surfaces opposite to each other of a parallelepiped block.

The optical module typically includes four LDs disposed on a line. In the optical module of the present application, the optical beams output from the composite prism are involved in a plane, or, symmetrically disposed around the optical axis of the condenser lens. Specifically, the optical beams output from the composite prism are disposed in respective corners of a rectangle or a square that has a center identical with the optical axis of the condenser lens.

The composite prism may include a first body and a second body. The first body includes a parallelepiped block having two input surfaces forming an external corner and two output surfaces also forming an external corner. The optical beams entering respective input surfaces of the first body output from respective output surfaces of the first body as crossing each other in the first body. Also, the optical beams output from the output surfaces of the first body enter the condenser lens without entering the second body. Specifically, the optical beams output from the first body may be involved in a plane with a level different from a plane where the optical beams entering the first body and the second body are involved.

When the optical module includes four LDs arranged in a line, the first body may receive optical beams emitted from inner two LDs and the second body may receive optical beams emitted from outer two LDs, or, the first body may receive optical beams emitted from two LDs arranged in one side, and the second body may receive optical beams emitted from other two LDs arranged in another side.

The first body and the second body provide an edge extending substantially in parallel to the optical axis of the condenser lens. Also, the second body may further provide an edge extending substantially perpendicular to the optical axis of the condenser lens.

BRIEF DESCRIPTION OF THE DRAWINGS

The foregoing and other purposes, aspects and advantages will be better understood from the following detailed description of a preferred embodiment of the invention with reference to the drawings, in which:

FIGS. 3A and 3B are plan view showing an optical module according to another embodiment of the present application, where FIG. 3A shows ray traces of optical beams emitted from inner two LDs, while, FIG. 3B shows ray traces of optical beams emitted from outer two LDs;

FIGS. 6A and 6B schematically show an optical module according to still another embodiment of the present application, where FIG. 6A show ray traces for inner two LDs, while, FIG. 6B show ray traces for outer two LDs;

FIG. 7A shows ray traces for inner two LDs and FIG. 7B shows ray traces for outer two LDs;

FIGS. 11A and 11B are plan views of still another composite prism that includes the first and second bodies, where, FIG. 11A shows ray traces for two LDs in one side, while, FIG. 11B shows ray traces for two LDs in another side;

FIG. 12 is a side view of the composite prism shown in FIGS. 11A and 11B; and

DETAILED DESCRIPTION

Next, some embodiments of the present application will be described as referring to drawings. In the description of the drawings, numerals or symbols same or similar to each other will refer to elements same or similar to each other without duplicated explanations.

Figure 1:
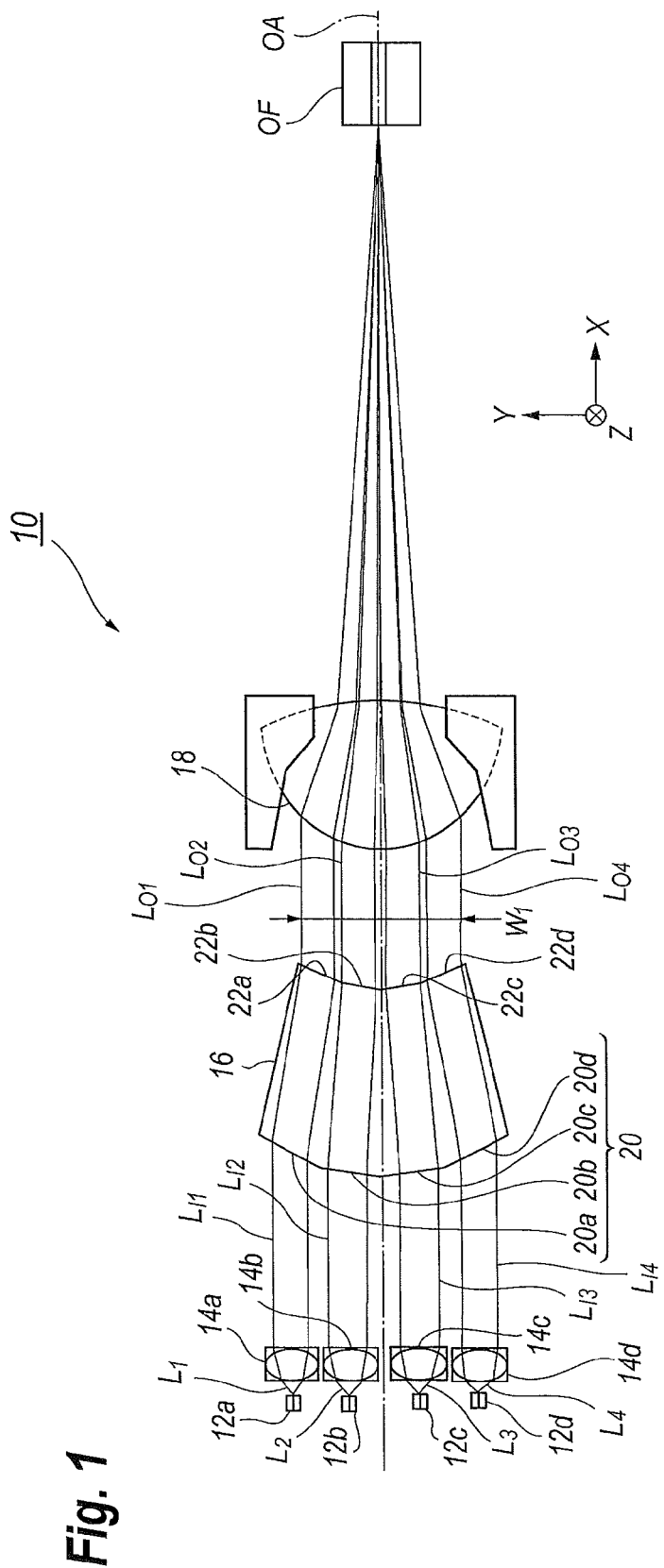
FIG. 1 is a plan view schematically showing an optical module according to an embodiment of the present application.

FIG. 1 is a plan view of an optical module according to an embodiment of the present application. The optical module 10 includes a plurality of laser diodes (LDs), 12a to 12d, a plurality of collimator lenses, 14a to 14d, a composite prism 16, and one condenser lens 18. The LDs, 12a to 12d, emit optical beams, $L_1$ to $L_4$, with wavelengths specific to respective LDs, 12a to 12d, but different from others. The wavelengths are involved in a wavelength band of 1.3 μm with an interval to the nearest one of 20 nm, that is, they follow the standard of the course wavelength division multiplexing (CWDM).

The optical beams, $L_1$ to $L_4$, are aligned within a virtual plane, namely, the XY plane in FIG. 1. The LDs, 12a to 12d, are disposed on respective sub-mounts and on a line along the Y-direction with a constant space, which may be determined by a lateral size of driver circuits, or driver ICs to drive respective LDs, 12a to 12d. The space between the LDs, 12a to 12d, is 0.75 mm in the present embodiment.

The LDs, 12a to 12d, are optically coupled with respective collimator lenses, 14a to 14d. That is, the collimator lenses, 14a to 14d, receive the respective optical beams, $L_1$ to $L_4$, which are originally divergent beams, to convert them into collimating beams, $L_{I1}$ to $L_{I4}$, and output the collimated beams, $L_{I1}$ to $L_{I4}$, with a field diameter of, for instance, 0.4 mmφ, to the composite prism 16 as the input optical beams.

Figure 2:
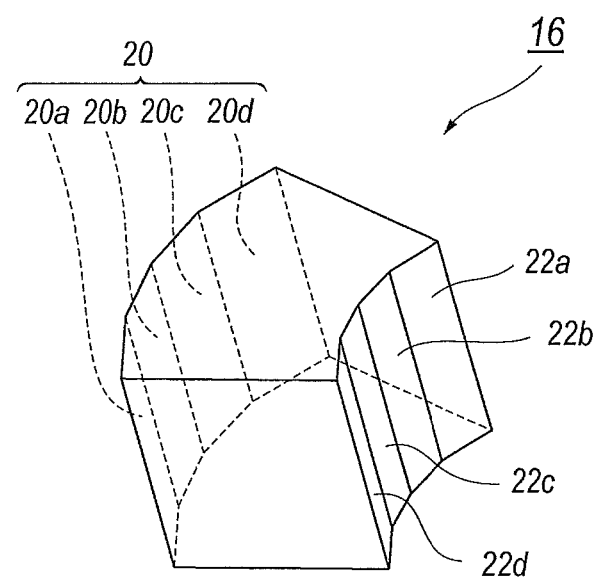
FIG. 2 is a perspective view of an example of a composite prism installed within the optical module shown in FIG. 1.

FIG. 2 is a perspective view of an example of the composite prism 16. The composite prism 16 provides four input surfaces, 20a to 20d, and four output surfaces, 22a to 22d. These surfaces, 20a to 22d, extend along the direction Z. The input surfaces, 20a to 20d, are optically coupled with respective collimator lenses, 14a to 14d. That is, the input optical beams, $L_{I1}$ to $L_{I4}$, enter respective input surfaces, 20a to 20d, of the composite prism 16.

The surface 20, which includes the input surfaces, 20a to 20d, has three external corners protruding toward the collimator lenses, 14a to 14d. Moreover, inner surfaces, 20b and 20c, make a same angle with respect to the optical axis OA. Outer surfaces, 20a and 20d, also make another same angle against the optical axis OA. The former angle for the inner two surfaces, 20b and 20c, is greater than the latter angle for the outer two surfaces, 20a and 20d. That is, the optical axis OA passes the external corner between two inner surfaces, 20b and 20c, and four input surfaces, 20a to 20d, are fanned out by the optical axis OA as a center.

The output surfaces, 22a to 22d, each corresponds to respective one of the input surfaces, 20a to 20d. Specifically, the output surface 22a is formed in parallel to the input surface 20a. Similarly, the output surfaces, 22b to 22d, are in parallel to respective input surfaces, 20b to 20d. Accordingly, the composite prism 16 integrates four parallel-plate mediums.

When the collimated input beams, $L_{I1}$ to $L_{I4}$, enter respective input surfaces, 20a to 20d, which cause the Fresnel diffraction thereat to make the optical axes of the input beams, $L_{I1}$ to $L_{I4}$, close to the optical axis OA. Then, the output surfaces, 22a to 22d, output respective output beams, $L_{O1}$ to $L_{O4}$, substantially in parallel to each other within the virtual plane. Moreover, the interval between output beams, $L_{O1}$ to $L_{O4}$, neighbor to each other is narrowed compared with the interval between the input beams, $L_{I1}$ to $L_{I4}$. In an example, the interval of the output beams, $L_{O1}$ to $L_{O4}$, is narrowed to 0.4 mm, with a total width $W_1$ of the field pattern of the output beams, $L_{O1}$ to $L_{O4}$, becomes less than 1.6 mm.

The composite prism 16 has an optical thickness along the Z-direction such that the input beams, $L_{I1}$ to $L_{I4}$, with the field diameter of 0.4 mmφ at most pass therethrough without leaking out. The composite prism 16 has the thickness of, for instance, 2 mm. Moreover, dimensions of the composite prism 16, for instance, a distance between the input and output surfaces forming parallel plate mediums, and/or the angle of the input surfaces, 20a to 20d, against the optical axis OA and the optical paths of the input beams, $L_{I1}$ to $L_{I4}$, entering the input surfaces, 20a to 20d, depend on the refractive index of the material constituting the composite prism 16. Moreover, the input surfaces, 20a to 20d, and the output surfaces, 22a to 22d, may be formed such that the input beams, $L_{I1}$ to $L_{I4}$, entering respective input surfaces, 20a to 20d, do not leak out to the output surfaces, 22a to 22d, next to the target output surface. The composite prism 16 may be made of, for instance, glass and/or resin transparent to the input beams, $L_1$ to $L_4$, which is widely used as a material for optical components.

The output surfaces, 22a to 22d, of the composite prism 16 are coupled with the condenser lens 18 which focuses the output beams, $L_{O1}$ to $L_{O2}$ on an end of the optical fiber OF. In an embodiment, the condenser lens 18 may be an aspheric lens with an input surface with a curvature and an output surface with another curvature different from the former one. The condenser lens 18 has a diameter of, for instance, 2.0 mm. In a modification, the condenser lens may have a flat output surface. The condenser lens 18 causes the Fresnel refraction for the output beams, $L_{O1}$ to $L_{O4}$, at the input surface and also at the output surface thereof to focus the output beams on the end of the optical fiber OF, which is apart by 4 to 6 mm from the output surface of the condenser lens 18. Thus, optical components such as an optical isolator may be disposed in this space between the output surface of the condenser lens 18 and the end of the optical fiber OF.

In the optical module 10 thus described, the composite prism 16 may output the output beams $L_{O1}$ to $L_{O4}$ by narrowed intervals even when the input beams, $L_{I1}$ to $L_{I4}$, show wider intervals, and the output beams, $L_{o1}$ to $L_{O4}$, are focused on the end of the optical fiber OF by the condenser lens 18. This enables that the output beams, $L_{O1}$ to $L_{O4}$, in the numerical aperture (NA) thereof approach that of the optical fiber OF, which enhances the coupling efficiency of the optical beams, $L_1$ to $L_4$, with the optical fiber OF. Moreover, the composite prism 16 is inherently cost-effective component compared with a wavelength selective filter (WSF), and/or an arrayed waveguide (AWG) each having a function to couple a plurality of optical beams with an optical fiber.

Next, another embodiment of an optical module of the present application will be described. FIGS. 3A and 3B are plan views of an optical module 10A of a modified embodiment of the present application, where FIG. 3A illustrates ray traces of the optical beams each derived from LDs, 12b and 12c, disposed inside; while, FIG. 3B illustrates ray traces of the other optical beams each output from LDs, 12a and 12d, arranged outside.

Figure 4B:
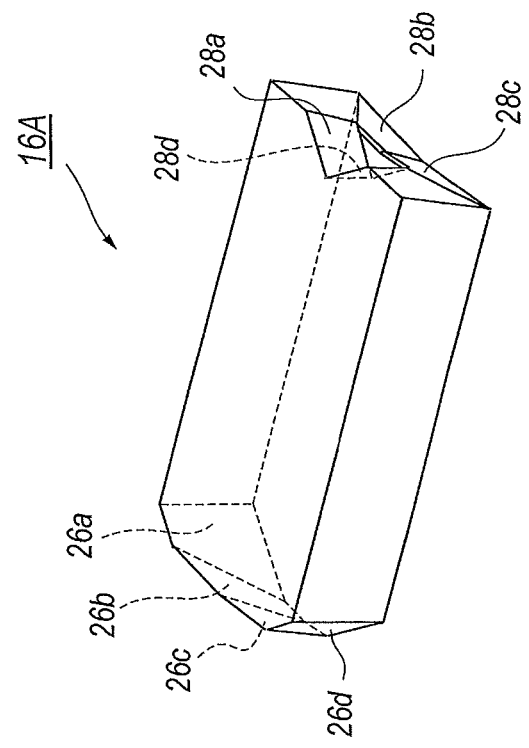
FIGS. 4A and 4B are perspective views of another composite prism installed in the optical module shown in FIGS. 3A and 3B.
Figure 4A:
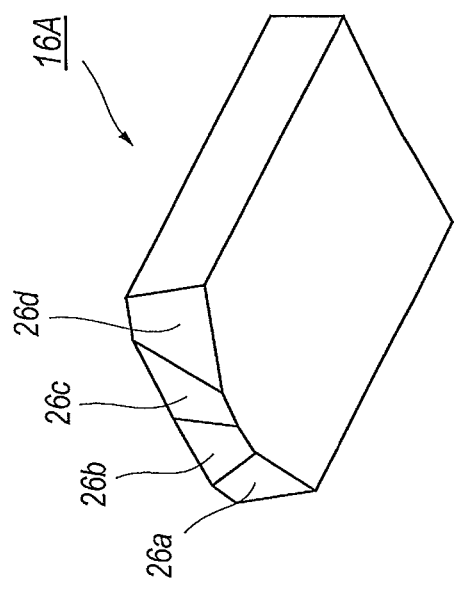
Figure 5B:
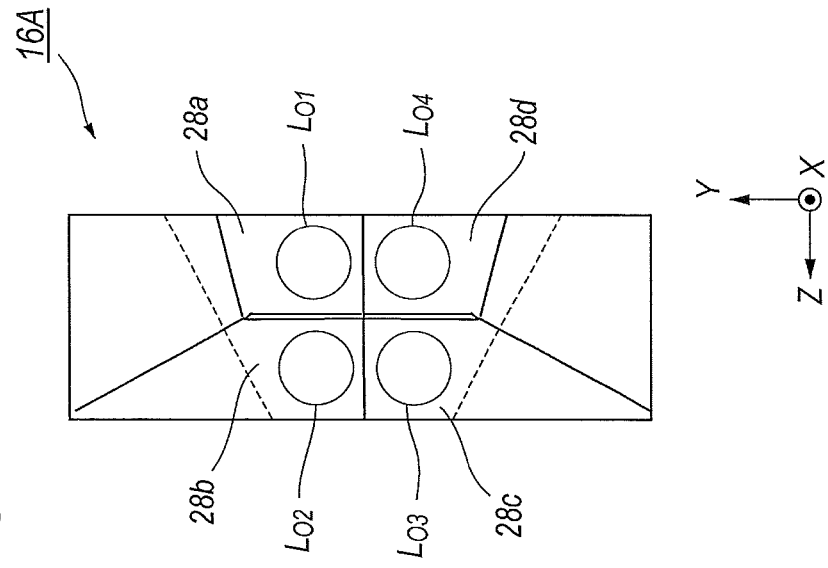
FIGS. 5A and 5B are front and rear views, respectively, of the composite prism shown in FIGS. 4A and 4B.
Figure 5A:
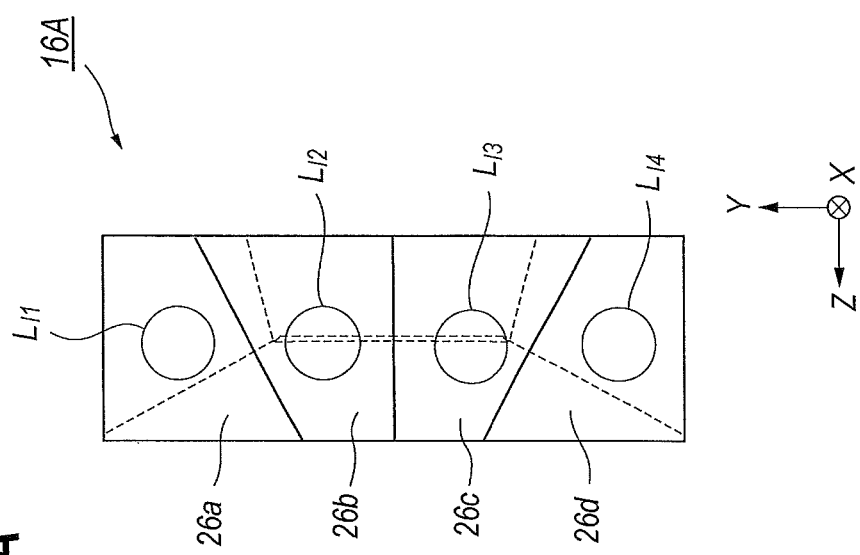

As shown in FIGS. 3A and 3B, the optical module 10A provides another composite prism 16A whose perspective view is illustrated in FIGS. 4A and 4B, where FIG. 4A shows input surfaces of the composite prism 16A, while, FIG. 4B shows output surface thereof. Moreover, FIG. 5A is a plan view showing the input surfaces and FIG. 5B is another plan view showing the output surfaces of the modified composite prism 16A. Referring to FIGS. 3 to 5, the composite prism 16A provides four input surfaces, 26a to 26d, and four output surfaces, 28a to 28d. The input surfaces, 26a to 26d, are optically coupled with respective collimator lenses, 14a to 14d, while, the output surfaces, 28a to 28d, are optically coupled with the condenser lens 18.

The composite prism 16A outputs the output beams, $L_{O1}$ to $L_{O4}$ with narrowed intervals by receiving the input beams, $L_{I1}$ to $L_{I4}$, with relatively wider intervals. Also, the composite prism 16A outputs output beams, $L_{O1}$ to $L_{O4}$, disposed in highly symmetry. For instance, the composite prism 16A outputs the output beams, $L_{O1}$ to $L_{I4}$, so that the output beams pass respective corners of a rectangle or a square extending in perpendicular to and centering the axis OA of the condenser lens 18. Accordingly, the output surfaces, 28a to 28d, of the composite prism 16A are formed such that the output surfaces, 28a to 28d, include respective points arranged symmetrically with respect to the optical axis OA of the condenser lens 18. That is, two output surfaces, 28a and 28d, attributed to the outer LDs, 12a and 12d, are formed in one side in the Z-direction; while, other two output surfaces, 28b and 28c, corresponding to the inner LDs, 12b and 12c, are disposed in another side in the Z-direction.

In the composite prism 16A, the input and output surfaces, 26a and 28a, are formed in parallel. A similar relation is reflected other three combinations of the input and output surfaces. That is, two surfaces, 26b and 28b, two surfaces, 26c and 28c, and two surfaces, 26d and 28d, are formed in parallel, respectively. The first input beam $L_{I1}$ enters the input surface 26a, advances upward as approaching the optical axis OA, and outputs from the output surface 28a as the output beam $L_{O1}$. The input and output surfaces, 26a and 28a, are formed in parallel but inclined with respect to the optical axis OA to cause the trace described above. The fourth input beam $L_{I4}$ enters the fourth input surface 26d, advances upward as approaching the optical axis OA in the composite prism 16A, and outputs from the output surface 28d. Accordingly, two surfaces, 26d and 28d, are formed in parallel but inclined with respect to the axis OA. The second input beam $L_{I2}$ enters the input surface 26b, advances downward as approaching the axis OA in the composite prism 16A, and outputs from the output surface 28b as the second output beam $L_{O2}$. Thus, two surfaces, 26b and 28b, extend in parallel but are inclined with respect to the axis OA. The third input beam $L_{I3}$ enters the input surface 26c, advances downward as approaching the axis OA in the composite prism 16A, and outputs from the output surface 28c as the third output beam $L_{O3}$. Thus, two surfaces, 26c and 28c, extend in parallel but are inclined with respect to the axis OA.

The composite prism 16A, similar to the aforementioned prism 16, narrows the interval of the input beams, $L_{I1}$ to $L_{I4}$, and outputs the output beams, $L_{O1}$ to $L_{O4}$, heading to the condenser lens 18 with narrowed intervals. The condenser lens 18 focuses the output beams, $L_{O1}$ to $L_{O4}$, on the end of the optical fiber OF. In addition, the output beams, $L_{O1}$ to $L_{O4}$, advance in parallel and symmetry with the axis OA of the condenser lens 18, which reduces a difference in the numerical aperture of respective output beams, $L_{O1}$ to $L_{O4}$.

Thus, the optical coupling efficiency of the optical beams, $L_1$ to $L_4$, output from respective LDs, 12a to 12d, with the optical fiber OF is enhanced. Moreover, the optical module 10A may narrow a field width of the output beams, $L_{O1}$ to $L_{O4}$, entering the condenser lens 18 compared with that shown in the aforementioned embodiment. That is, the aforementioned embodiment forms the collective field pattern of the output beams, $L_{O1}$ to $L_{O4}$, with laterally spreading; while, the present optical module 10A shows the collective field pattern of the output beams, $L_{O1}$ to $L_{O4}$, with a symmetrical distribution around the axis OA. Thus, the optical module 10A of the present embodiment simplifies the design of the input surface of the condenser lens 18, and enables to reduce the numerical aperture (NA) of the condenser lens 18.

Next, an optical module according to still another embodiment of the present application will be described. FIGS. 6A and 6B show plan views of an optical module 10B, where FIG. 6A illustrates ray traces of the optical beams, $L_2$ and $L_3$, output from the inner LDs, 12b and 12c, while, FIG. 6B illustrates ray traces of the optical beams, $L_1$ and $L_4$, each output from the outer LDs, 12a and 12D.

The optical module 10B provides additional condenser lenses, 30a to 30d, disposed between the LDs, 12a to 12d, and the collimator lenses, 14a to 14d. Each of the condenser lenses, 30a to 30d, forms respective beam waist. That is, the condenser lenses, 30a to 30d, are positioned such that the LDs, 12a to 12d, in respective light-emitting points are apart from the focal points of the condenser lenses, 30a to 30d. Then, each of the optical beams, $L_1$ to $L_4$, output from respective LDs, 12a to 12d, is condensed in the respective beam waist.

Moreover, the collimator lenses, 14a to 14d, are arranged such that their focal points are positioned beyond the focal points of the condenser lenses, 30a to 30d, in the side of the collimator lenses, 14a to 14d. That is, the collimator lenses, 14a to 14d, are set in positions where substantial offsets exist between the focal points of the condenser lenses, 30a to 30d, and those of the collimator lenses, 14a to 14d. Then, the optical beams, $L_{I1}$ to $L_{I4}$, output from the collimator lenses, 14a to 14d, may be further reduced in the field diameter thereof. Accordingly, the optical arrangement shown in FIGS. 6A and 6B effectively suppresses the optical beams, $L_{I1}$ to $L_{I4}$ entering the input surfaces, 26a to 26d, from leaking out to the neighbor surfaces.

Figure 7A:
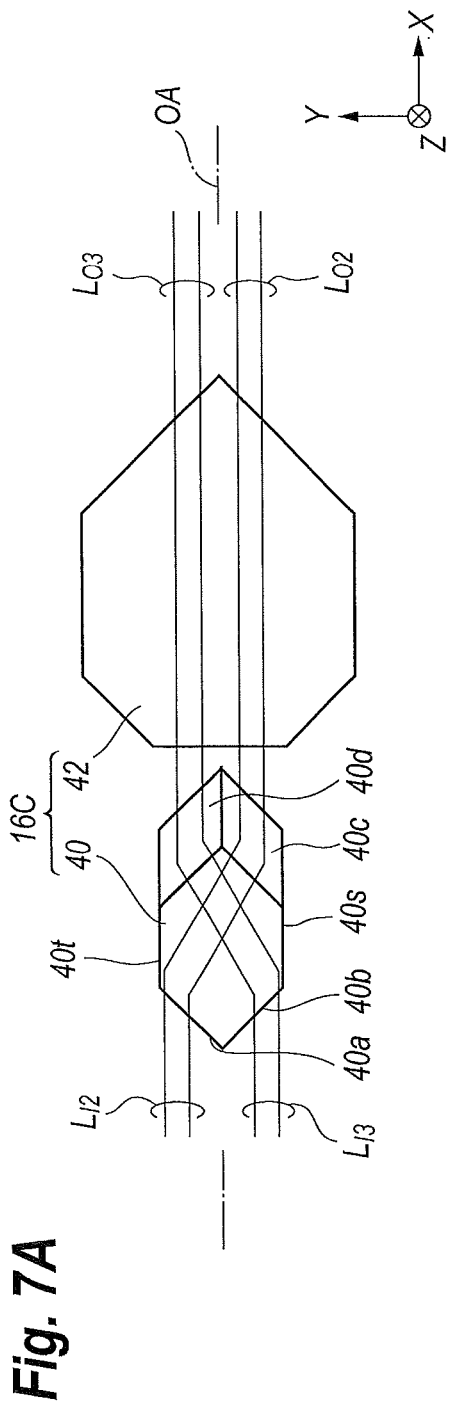
FIGS. 7A and 7B are plan views of a composite prism including two bodies according to still another embodiment of the present application, where
Figure 7B:
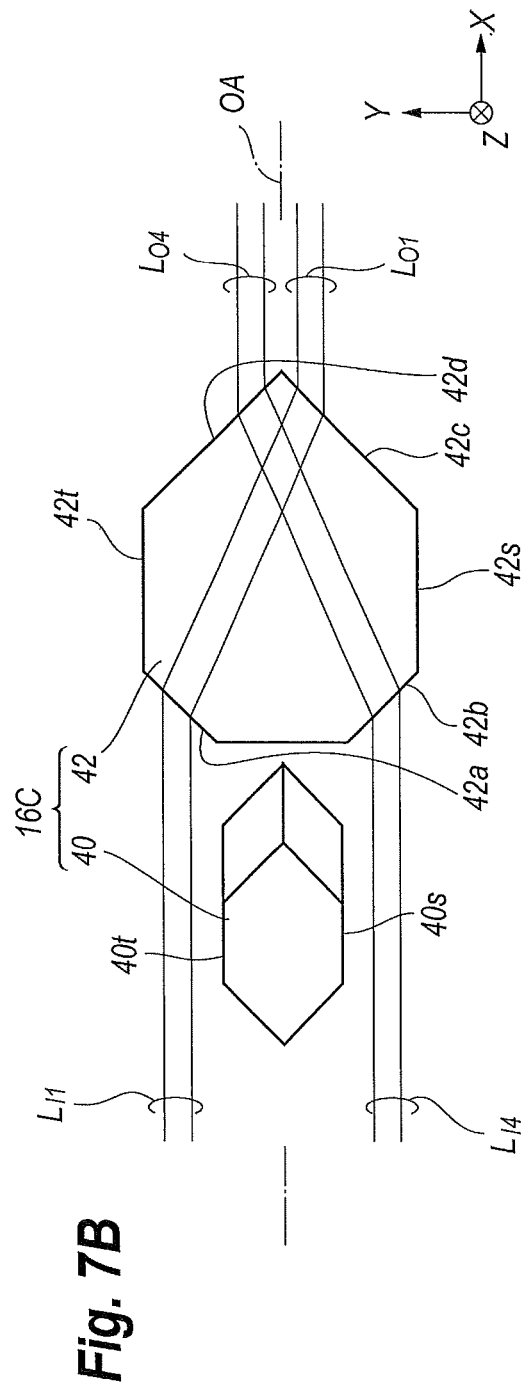
Figure 8:
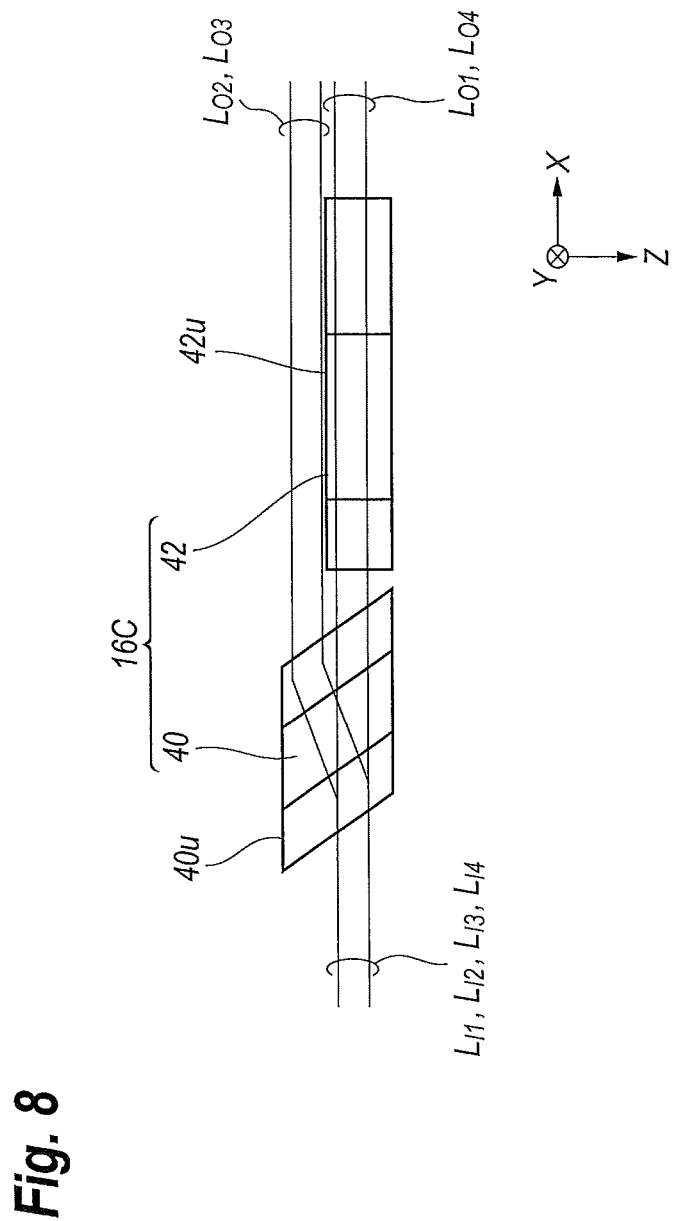
FIG. 8 is a side view of the composite prism shown in FIGS. 7A and 7B.
Figure 9A:
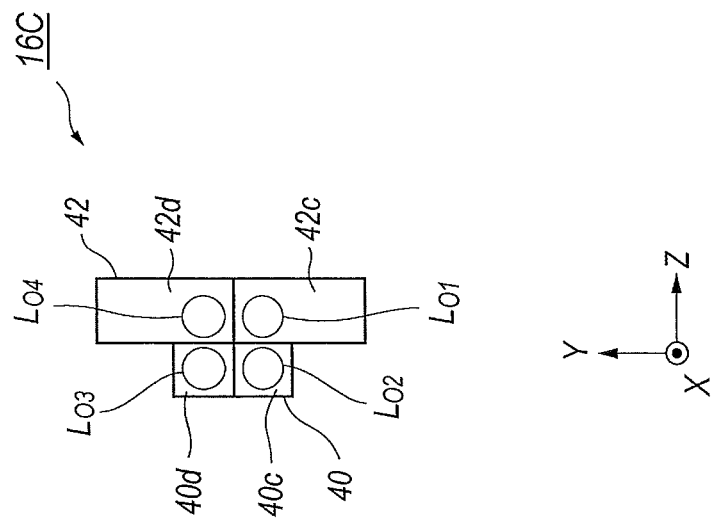
FIGS. 9A and 9B show front and rear views of the composite prism, respectively, shown in FIGS. 7A and 7B.
Figure 9B:
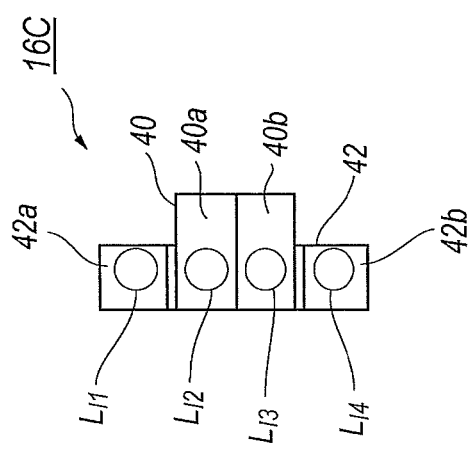

Next, modifications of the composite prism applicable to the optical modules shown in FIGS. 3 and 6 will be described. FIGS. 7A and 7B show plan views of the composite prism 16C according to another embodiment. FIG. 7A illustrates ray traces of the optical beams, $L_{I2}$ and $L_{I3}$, emitted from the inner LDs, 12b and 12c, while, FIG. 7B illustrates ray traces of the optical beams, $L_{I1}$ and $L_{I4}$, coming from the outer LDs, 12a and 12d. FIG. 8 is a side view of the composite prism 16C shown in FIGS. 7A and 7B; while, FIG. 9A shows input surfaces, 40a, 40b, 42a, and 42b, of the composite prism 16C, and FIG. 9B shows output surfaces, 40c, 40d, 42c, and 42d.

The composite prism 16C, which is substitutable of the aforementioned composite prisms, 16 to 16B, includes the first body 40 and the second body 42. The first body 40 provides two input surfaces, 40a and 40b, and two output surfaces, 40c and 40d. The former input surface 40a and the former output surface 40c extend in parallel but are inclined with respect to three directions, X, Y, and Z. The latter input surface 40b and the latter output surface 40d also extend in parallel but are inclined with respect to three directions, X, Y, and Z. That is, the input surface 40a and the output surface 40c are two surfaces constituting the parallel plate, while, the input surface 40b and the output surface 40d are also two surfaces constituting another parallel plate. Moreover, two input surfaces, 40a and 40b, form an external corner, while, two output surface, 40c and 40d, also constitute an external corner. Thus, the first body 40 is a parallelepiped block having two input surfaces, 40a and 40b, and two output surfaces, 40c and 40d.

The second optical beam $L_{I2}$ entering the input surface 40a is refracted upward thereat to head for the output surface 40c and is output therefrom as the output optical beam $L_{O2}$. The third optical beam $L_{I3}$ entering the input surface 40b is also refracted upward thereat to head for the output surface 40d as crossing the former optical beam $L_{I2}$ in the first body 40 and output from the output surface 40d as the output optical beam $L_{O3}$. Because two optical beams, $L_{I2}$ and $L_{I3}$, crosses in the first body 40, the disposition of the output optical beams, $L_{O2}$ and $L_{O3}$, are exchanged from the input optical beams, $L_{I2}$ and $L_{I3}$. Moreover, two input surfaces, 40a and 40b, and two output surfaces, 40c and 40d, are inclined with respect to the Z-direction; accordingly, two output optical beams, $L_{O2}$ and $L_{O3}$, form a virtual plane different from but extending in parallel to another virtual plane containing the input optical beams, $L_{I1}$ to $L_{I4}$. Two output beams, $L_{O2}$ and $L_{O3}$, are positioned in two corners of a rectangle or a square whose center coincides with the optical axis OA.

In addition, the first body 40 further provides a surface extending in parallel to the optical axis OA. The embodiment shown in FIGS. 7A and 7B provide two surfaces, 40s and 40t, extending in parallel to the axis OA. These two surfaces, 40s and 40t, are used to align the first body 40 along the optical axis OA. Moreover, two surfaces, 40s and 40t, may generate spaces to pass the other input optical beams, $L_{I1}$ and $L_{I4}$, to enter the second body 42. Two optical beams, $L_{I1}$ and $L_{I4}$, are not interfered with the first body 40 to enter the second body 41.

The second body 42 includes two input surfaces, 42a and 42b, and two output surfaces, 42c and 42d. Similar to the first body 40, the input surface 42a and the output surface 42c extend in parallel but are inclined with respect to both X- and Y-direction; the second input surface 42b and the second output surface 42d also extend in parallel but are inclined with respect to both X- and Y-directions. These input surfaces, 42a and 42b, and the output surfaces, 42c and 42d, forms a convex polyhedron.

The first optical beam $L_{I1}$ entering the input surface 42a is refracted thereat to head for the output surface 42c and output therefrom as the output beam $L_{O1}$. The fourth optical beam $L_{I4}$ entering the other input surface 42d is refracted thereat to head for the output surface 42d as crossing the first optical beam $L_{I1}$ in the second body 42. Accordingly, the output beams, $L_{O1}$ and $L_{O4}$, change the positions thereof with respect to the input optical beams, $L_{I1}$ and $L_{I4}$. Moreover, two output beams, $L_{O1}$ and $L_{O4}$, are positioned in respective two corners of the rectangle, or the square whose center coincides with the optical axis OA of the condenser lens 18 set downstream of the composite prism 16C.

Moreover, the second body 42 also provides a surface extending in parallel to the optical axis OA. That is, the second body 42 of the embodiment provides two surfaces, 42s and 42t, extending in parallel and along the optical axis OA of the condenser lens 18. These two surfaces, 42s and 42t, not only simplify the alignment of the second body 42 but reduce the size of the composite prism 16C.

Referring to FIG. 8, the second body 42 has a top surface 42u whose level is lower than the level of the top surface 40u of the first body 40. The output beams, $L_{O2}$ and $L_{O3}$, output from the output surfaces, 40c and 40d, of the first body 40 are not interfered with the second body 42 to enter the condenser lens 18. The output beams, $L_{O2}$ and $L_{O3}$, pass above the top surface 42u of the second body 42.

Figure 10:
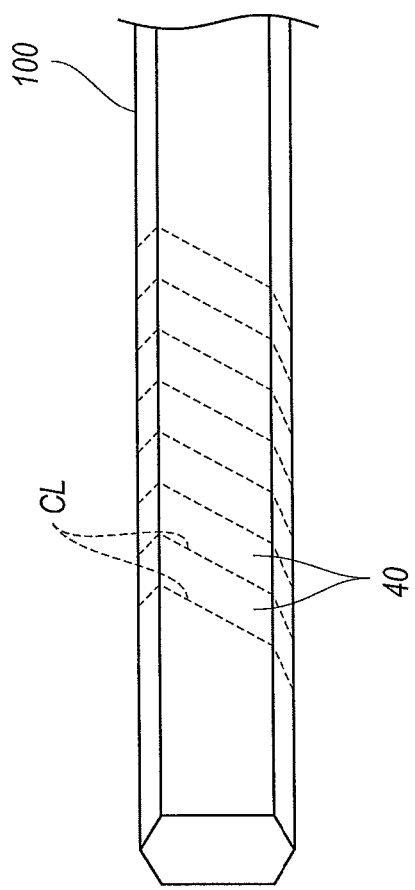
FIG. 10 schematically shows a method to form the first body of the composite prism shown in FIGS. 7A and 7B.

In the composite prism 16C of the present embodiment, the input surfaces, 40a, 40b, 42a, and 42b, and the output surface, 40c, 40d, 42c, and 42d, of the first and second bodies, 40 and 42, respectively, are surfaces constituting a polyhedron, in particular, the first body 40 is a parallelepiped block. Accordingly, the first and second bodies, 40 and 42, may be produced by cutting a columnar bar. For instance, the first body 40 may be formed by cutting a hexagonal bar diagonally along dotted lines CL shown in FIG. 10. Also, the second body 42 may be formed by cutting orthogonally a columnar bar whose plane shape is like those shown in FIGS. 7A and 7B. In a modification, the first body 40 may be formed by cutting a quadrangular bar diagonally to form a parallel piped block and cutting both sides of the parallel piped block so as to expose the side surfaces, 40s and 40t.

The input surfaces, 40a and 40b, form an external corner, which enables to form anti-reflecting (AR) films thereon easily. Specifically, two input surfaces may face a source for the AR film by distances same with each other, which means that the AR films deposited on respective input surfaces become homogeneous. Similarly, two output surfaces, 40c and 40d, of the first body 40, and the output surfaces, 42c and 42d, of the second body 42 also form respective external corners. Accordingly, these output surfaces, 40c, 40d, 42c, and 42d, may provide respective AR films homogeneous to each other.

Figure 13A:
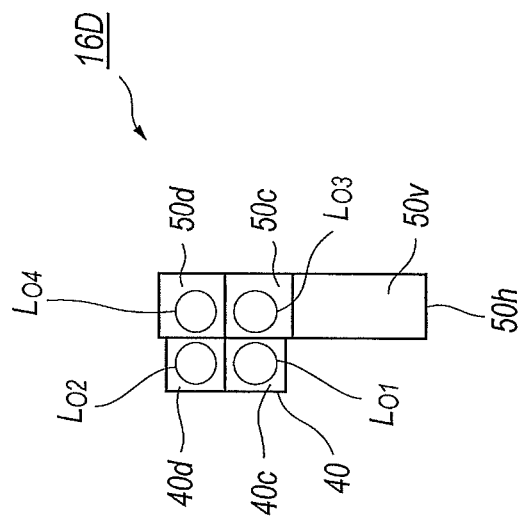
FIGS. 13A and 13B are front and rear views, respectively, of the composite prism shown in FIGS. 11A and 11B.
Figure 13B:
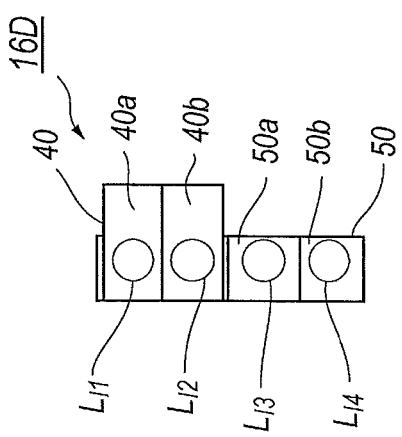

Next, still another composite prism substitutable for the composite prism shown in FIGS. 3A, 3B, 6A, and 6B. FIGS. 11A and 11B are plan views of a composite prism 16D according to still another embodiment of the present application. FIG. 11A shows ray traces of the input optical beams, $L_{I1}$ and $L_{I2}$, of two LDs disposed in one side, while, FIG. 11B shows ray traces of the other input beams, $L_{I3}$ and $L_{I4}$, of two LDs disposed in another side. FIG. 12 is a side view of the composite prism 16D, and FIGS. 13A and 13B are front and rear views of the composite prism 16D, respectively; that is, FIG. 13A show input surfaces with the field patterns of the input optical beams, $L_{I1}$ to $L_{I4}$, while, FIG. 13B show the output surfaces with the field patterns of the output beams, $L_{o1}$ to $L_{O4}$.

The composite prism 16D of the present embodiment also comprises two bodies, the first body 40 and the second body 50. The first body 40 in the shape thereof is substantially same with those of the aforementioned body shown in FIGS. 7A and 7B. That is, the first body 40 receives the optical beam $L_{I1}$ in the first input surface 40a and outputs the optical beam $L_{O1}$ from the output surface 40c. Also, the second input surface 40b receives the second optical beam $L_{I2}$ and outputs this second input optical beam $L_{I2}$ from the second output surface 40d as the second output beam $L_{O2}$. Because a pair of surfaces, 40a and 40c, and another pair of surfaces, 40b and 40d, each extends in parallel but are inclined with respect to respective input beams, $L_{I1}$ and $L_{I2}$, the output beams, $L_{O1}$ and $L_{O2}$, are involved in a virtual plane extending in parallel to another virtual plane that involves the input beams, $L_{I1}$ to $L_{I2}$. Moreover, the input beams, $L_{I1}$ and $L_{I2}$ cross in the first body, the disposition of the output optical beams, $L_{O1}$ and $L_{O2}$, is transposed from that of the input optical beams, $L_{I1}$ and $L_{I2}$. The output beams, $L_{O1}$ and $L_{O2}$, are disposed in respective upper corners of a rectangle, or a square, whose center is aligned with the optical axis OA of the condenser lens 18. The first body 40 is disposed not so as to interfere with the rest input beams, $L_{I3}$ and $L_{I4}$, to enter the second body 50.

The second body 50 includes two input surfaces, 50a and 50b, and two output surfaces, 50c and 50d. The former input surface 50a and the former output surface 50c extend in parallel but are inclined with respect to both X- and Y-directions. The latter input surface 50b and the latter output surface 50d also extend in parallel but are inclined with both X- and Y-directions. Two input surfaces, 50a and 50b, form an external corner, and the output surfaces, 50c and 50d, also form an external corner. Thus, the second body 50 is a polyhedron having no internal corners.

The second body 50 receives the third input beam $L_{I3}$ in the input surface 50a and output this input beam from the output surface 50c as the third output beam $L_{O3}$. Similarly, the other input surface 50b receives the fourth input beam $L_{I4}$ and output this optical beam from the other output surface 50d as the fourth output beam $L_{O4}$. Because the third and fourth input beams, $L_{I3}$ and $L_{I4}$, cross in the second body 50; the disposition of the output beams, $L_{O3}$ and $L_{O4}$, is transposed from that of the input beams, $L_{I3}$ and $L_{I4}$. Moreover, the output beams, $L_{O3}$ and $L_{O4}$, are involved in a plane that involves all input beams, $L_{I1}$ to $L_{I4}$, and pass lower corners of the rectangle, or the square, whose center is aligned with the optical axis OA of the condenser lens 18.

The second body further provides a surplus area 50r where neither the third optical beam $L_{I3}$ nor the fourth input optical beam $L_{I4}$, passes. This surplus area 50r provides two sides, 50h and 50v, perpendicular to each other. Specifically, the side 50v extends in perpendicular to the optical axis OA, while, the other side 50h extends in parallel to the optical axis OA. These two sides, 50h and 50v, may enhance the optical alignment of the second body 50 with respect to the first body 50 and the condenser lens 18.

The top surface 50u of the second body 50 in a level thereof is lowered from that of the top surface 40u of the first body, which means that the first and second output beams, $L_{O1}$ and $L_{O2}$, head for the condenser lens 18 as passing above the top surface 50u of the second body. The first and second output beams, $L_{O1}$ and $L_{O2}$, head for the condenser lens 18 without being interfered with the second body 50.

The second body 50 of the composite prism 16D of the present embodiment may be also easily formed by cutting a columnar bar. Also, because two input surfaces, 50a and 50b, and two output surfaces, 50c and 50d, each form external corners, which enable to deposit AR films on respective surfaces homogeneously.

In the foregoing detailed description, the optical modules of the present application have been described with reference to specific exemplary embodiments thereof. It will, however, be evident that various modifications and changes may be made thereto without departing from the broader spirit and scope of the present invention.

For example, although the optical modules above described provide four (4) LDs, 12a to 12d, the number of LDs is not limited. The optical modules that install at least two LDs may have advantages of the present invention. The number of collimator lenses, that of the input and output surfaces of the composite prism, the incident angle of the input optical beams to the input surfaces, and so on may be optionally varied depending on the number of the LDs. Also, the optical modules described in the present specification are applicable to the WDM system, where respective LDs emit optical beams each having a specific wavelength different from others. However, the concept of the present application may be also applicable to an optical module for the coherent optical communication where a plurality of optical beams each having a wavelength same with other but a phase thereof different from others. Accordingly, the present specification and figures are to be regarded as illustrative rather than restrictive.

What is claimed is:

1. An optical module, comprising:
   a plurality of laser diodes (LD) configured to emit optical beams;
   a plurality of collimator lenses, each being optically coupled with respective one of the LDs and collimating respective one of the optical beams;
   a composite prism providing a plurality of input surfaces and a plurality of output surfaces, the input surfaces receiving optical beams output from respective collimator lenses, the output surfaces outputting respective optical beams; and
   a condenser lens having an optical axis, the condenser lens configured to focus the respective optical beams output from the output surfaces of the composite prism on an end of an external fiber,
   wherein the composite prism reduces intervals between optical beams entering therein to output the optical beams with reduced intervals,
   wherein each of the input surfaces of the composite prism is optically coupled with one of output surfaces specific to each of the input surfaces, and
   wherein each of the input surfaces and one of the output surfaces specific to each of the input surfaces extend in parallel but are inclined with respect to an optical axis of respective one of the optical beams entering each of the input surfaces.

2. The optical module of claim 1, wherein each of the input surfaces and one of the output surfaces specific to each of the input surfaces constitute two surfaces opposite to each other of a parallelepiped block.

3. The optical module of claim 1, wherein the optical beams output from the composite prism are arranged in a plane.

4. The optical module of claim 1, wherein the optical beams output from the composite prism are symmetrically disposed with respect to the optical axis of the condenser lens.

5. The optical module of claim 1, wherein the optical module includes four LDs arranged in a line, as the plurality of the LDs.

6. The optical module of claim 5, wherein the optical beams output from the composite prism are disposed in respective corners of a rectangle that has a center identical with the optical axis of the condenser lens.

7. An optical module comprising:
   a plurality of laser diodes (LD) configured to emit optical beams;
   a plurality of collimator lenses, each being optically coupled with respective one of the LDs and collimating respective one of the optical beams;
   a composite prism providing a plurality of input surfaces and a plurality of output surfaces, the input surfaces receiving optical beams output from respective collimator lenses, the output surfaces outputting respective optical beams; and
   a condenser lens having an optical axis, the condenser lens configured to focus the respective optical beams output from the output surfaces of the composite prism on an end of an external fiber, wherein the composite prism reduces intervals between optical beams entering therein to output the optical beams with reduced intervals, wherein the composite prism includes a first body and a second body, wherein the first body includes a parallelepiped block having two input surfaces forming an external corner and two output surfaces forming an external corner, and wherein the optical beams entering respective ones of the input surfaces of the first body output from respective ones of the output surfaces of the first body as crossing each other in the first body.

8. The optical module of claim 7, wherein the optical beams output from the output surfaces of the first body enter the condenser lens without entering the second body.

9. The optical module of claim 8, wherein the optical beams output from the first body are involved in a plane with a level different from a plane where the optical beams entering the first body and the second body are involved.

10. The optical module of claim 7, wherein the first body and the second body provide an edge extending substantially in parallel to the optical axis of the condenser lens.

11. The optical module of claim 10, wherein the second body further provides an edge extending substantially perpendicular to the optical axis of the condenser lens.

12. The optical module of claim 7,
wherein the optical module includes four LDs disposed on a line, as the plurality of the LDs, and
wherein the first body receives optical beams emitted from inner two LDs among the four LDs and the second body receives optical beams emitted from outer two LDs among the four LDs.

13. The optical module of claim 7,
wherein the optical module includes four LDs disposed on a line, as the plurality of the LDs, and
wherein the first body receives optical beams emitted from two LDs arranged in one side among the four LDs, and the second body receives optical beams emitted from other two LDs arranged in another side among the four LDs.

14. The optical module of claim 7, wherein the first body and the second body have no internal corners.

15. An optical module comprising:
a plurality of laser diodes (LD) configured to emit optical beams;
a plurality of collimator lenses, each being optically coupled with respective one of the LDs and collimating respective one of the optical beams;
a composite prism providing a plurality of input surfaces and a plurality of output surfaces, the input surfaces receiving optical beams output from respective collimator lenses, the output surfaces outputting respective optical beams;
a condenser lens having an optical axis, the condenser lens configured to focus the respective optical beams output from the output surfaces of the composite prism on an end of an external fiber, wherein the composite prism reduces intervals between optical beams entering therein to output the optical beams with reduced intervals; and
a plurality of auxiliary lenses set between the LDs and the collimator lenses,
wherein each of the auxiliary lenses concentrates optical beams emitted from respective one of the LDs and forms beam waist, and each of the collimator lenses collimates the beam waist formed by the respective one of the auxiliary lenses.

16. The optical module of claim 1, wherein the composite prism is made of material transparent to the optical beams.

17. The optical module of claim 1, wherein the optical beams are attributed to wavelengths specific to respective ones of the LDs and different from others.

18. The optical module of claim 7, wherein the composite prism is made of material transparent to the optical beams.

19. The optical module of claim 7, wherein the optical beams are attributed to wavelengths specific to respective ones of the LDs and different from others.

20. The optical module of claim 15, wherein the composite prism is made of material transparent to the optical beams.

21. The optical module of claim 15, wherein the optical beams are attributed to wavelengths specific to respective ones of the LDs and different from others.

* * * * *